Aug. 19, 1958 F. C. McNICOL ET AL 2,848,630
ELECTRICAL CONTROLLER AND CIRCUITS
UTILIZING SUCH A CONTROLLER
Filed June 4, 1956 3 Sheets-Sheet 1

Inventors
Forrest C. McNicol
Richard R. Ranson
By H R Ratter
Attorney

Aug. 19, 1958    F. C. McNICOL ET AL    2,848,630
ELECTRICAL CONTROLLER AND CIRCUITS
UTILIZING SUCH A CONTROLLER
Filed June 4, 1956    3 Sheets-Sheet 3
Fig. 3
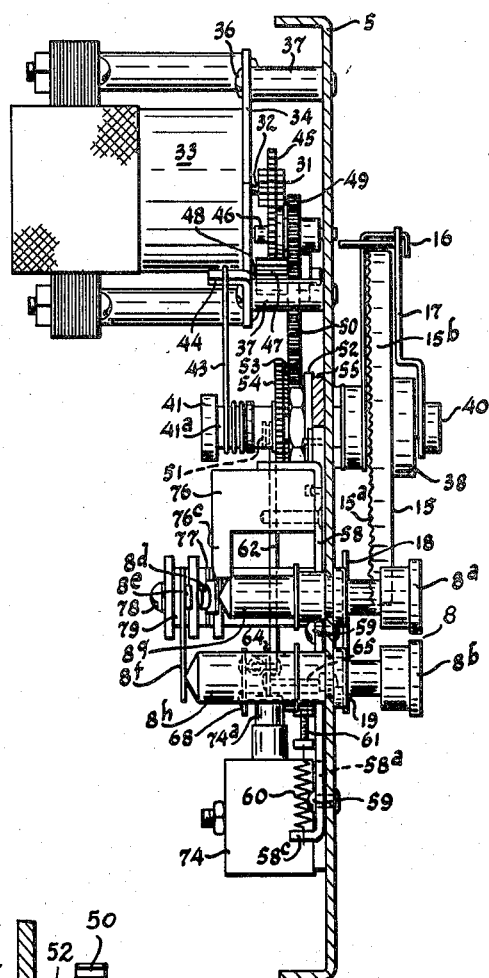
Fig. 4
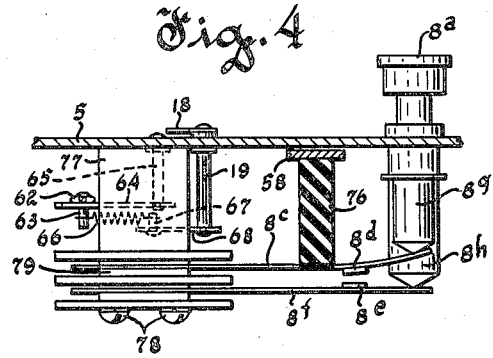
Fig. 5
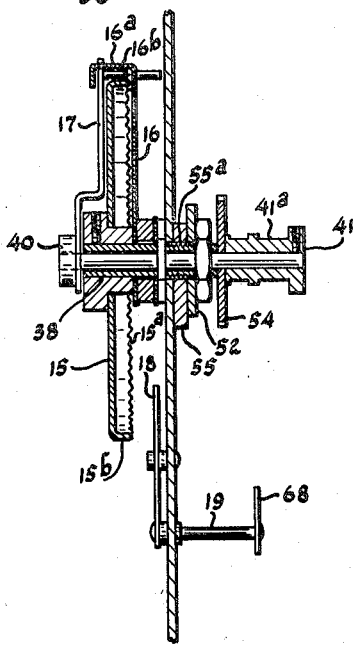
Fig. 7
Inventors.
Forrest C. McNicol
Richard R. Ranson
By H R Rather
Attorney United States Patent Office 2,848,630
Patented Aug. 19, 1958

2,848,630

ELECTRICAL CONTROLLER AND CIRCUITS UTILIZING SUCH A CONTROLLER

Forrest C. McNicol, Milwaukee, and Richard R. Ranson, Whitefish Bay, Wis., assignors to Cutler-Hammer, Inc., Milwaukee, Wis., a corporation of Delaware Application June 4, 1956, Serial No. 589,049

18 Claims. (Cl. 307—112)

This invention relates to an improved electrical controller and circuits utilizing such a controller.

While not limited thereto the present invention is advantageous for use with electric oil well pump motors and the like, particularly where a plurality of such motors are used in an oil well field.

Oil well fields having large numbers of pumping wells commonly use individual electric motors for driving each well pump. Because of state code and production requirements controllers for the pump motors incorporate clock programmers to regulate the intervals of pump operation. Such controllers also incorporate time delay start devices to insure time delay in completion of power connections to the pump motors following failure of electrical power supply to the oil well field and restoration of such power supply. With the controller for each pump motor set to have a different delay interval from others, simultaneous connection of any two motors to the power supply is prevented, thereby insuring against tripping of main or branch circuit breakers or overloading of fuses in such circuits.

A primary object of the present invention is to provide an improved electrical controller incorporating the aforementioned programming and time delay start features, together with improved under voltage protection and release features.

Another object is to provide a controller of the aforementioned type which affords flexibility in respect of automatic operation including the programming and time delay start features, manual operation without the programming feature and with or without the time delay start feature, and for automatic or manual reinitiation of its automatic operation following failure and restoration of power supply to the controller.

A further object is to provide improved circuits for use of the controller in conjunction with a motor controlled thereby.

A more specific object is to provide in a controller of the aforementioned type for continuous drive of the program clock and interruptible drive of an interval timer from a common drive motor.

Another more specific object is to provide for completion of the drive to the interval timer, either as a result of completion of power supply to the controller or at the will of a human operator following such completion of the power supply, and for interruption of such drive following completion of the timed interval.

A further specific object is to insure interruption of the aforementioned drive and reset of the interval timer in the event of failure of power supply to the controller at any time during the timing interval, and A still further specific object is to insure interruption of power connections to a controlled motor, or other device, either in the event of phase voltages in a three phase power supply source with which the controller is used, or in the event of reduction of one of the phase voltages below a predetermined value.

Other objects and advantages of the invention will hereinafter appear.

The accompanying drawings illustrate preferred embodiments of the invention which will hereinafter be described in detail, it being understood that the embodiments illustrated are susceptible of modifications in respect of details without departing from the scope of the appended claims.

In the drawings:

Fig. 3 is a sectional view, in side elevation, taken along the line 3—3 of Fig. 2.

Fig. 4 is a fragmentary sectional view taken along the line 4—4 of Fig. 2.

Fig. 5 is a fragmentary sectional view taken along the line 5—5 of Fig. 2.

Fig. 7 is a fragmentary sectional view in side elevation taken in the direction of the arrows 7—7 of Fig. 2.

Figure 1:
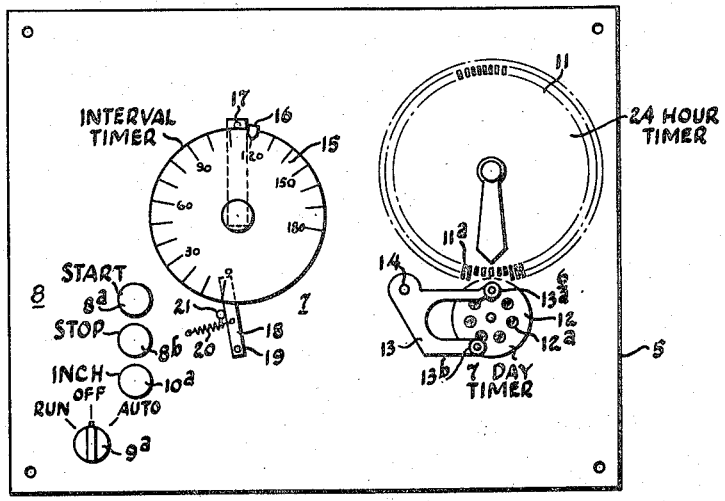
Figure 1 is a front elevational view of an electrical controller constructed in accordance with the invention.

Referring to Figs. 1 to 5, it will be seen that the improved controller is assembled on a panel 5. As shown in Fig. 1 on the front of the panel are mounted a program clock, generally designated 6, an interval timer, generally designated 7, push-button operators 8$^a$ and 8$^b$ of a "Start-Stop" switch 8, and the rotatable knob 9$^a$ of a selector switch 9, and the push-button operator 10$^a$ of an "inch" switch 10. The program clock comprises a twenty-four hour rotating dial 11, a seven-day rotating dial 12 and a switch operating lever 13 which is fixed to a shaft 14 and is operated by dials 11 and 12. The interval timer comprises a stationary interval indicating dial 15, a resettable interval determining stop 16, a rotatable timing arm 17 and a switch operating lever 18 fixed on a shaft 19 and biased by a spring 20 against a stop 21.

Now referring particularly to Figs. 2 to 5, the shaft 14 carrying lever 13 extends through and is rotatably mounted on panel 5 and has fixed thereto, rearwardly of the panel, a lever 14$^a$ which is engageable with an actuator 23$^a$ of a switch 23. Although not shown it may be assumed that shaft 14 has a suitable torsion spring biasing it so that lever 21 is normally disengaged from actuator 23$^a$, and when the latter is so disengaged that contacts 23$^b$ (see Fig. 6) of switch 23 are in closed position. It may also be assumed that the contacts of switch 23 are opened by engagement of lever 21 with actuator 23$^a$ when shaft 14 and lever 13 are rotated by engagement of rollers carried on the arms 13$^a$ and 13$^b$ (see Fig. 1) of the latter with any one or more of the outwardly set, settable tabs 11$^a$ on dial 11 or with any one or more of outwardly adjusted cam screws 12$^a$ carried on dial 12. Thus switch 23 can be closed and opened for preselected intervals in any twenty-four hour period in accordance with the inward and outward setting of interval tabs 11$^a$, corresponding to particular intervals in that period, and can be held open for any one or more days of any seven day period as determined by the outward setting of the cam screws 12$^a$ in the manner more completely described in the Everard Patent No. 2,596,330. Reference should be made to this patent for complete structural details of the hereinbefore described program clock and mode of operation of the switch it controls.

Dial 11 may be assumed to have a concentric bearing sleeve (not shown) on which it and a large gear 24, being behind dial 11, are fixed. A spindle 25 fixed to and extending frontwardly of panel 5, by means of nuts 26 taking down on opposite side of the panel, affords rotational support for the bearing sleeve, dial 11 and gear 24 on the front of the panel. A pinion 27 which is fixed on a shaft 28 extending through and rotatably supported on the panel meshes with the gear 24. Rearwardly of the panel, shaft 28 has a gear 29 fixed thereon which meshes with a larger gear 30. Gear 30 meshes with a pinion 31 fixed on the shaft 32 of an electric motor 33 which is preferably a synchronous type clock motor. Motor 33 is mounted on a sub-panel 34 which is secured in spaced apart relation to the rear of panel 5 by a plurality of long shanked mounting screws 36 and spacing collars 37 disposed about the shanks of screws 36. It may be assumed that the gears in train between shaft 32 of motor 33 and dial 11 are so ratioed that whenever motor 33 is energized dial 11 will be rotated at a rate affording one complete revolution in each twenty-four hour period.

Showing and description of the gear train for rotating dial 12 at a rate affording it one complete revolution in each seven day period is herein omitted for the sake of simplicity. It may be assumed to be derived from a gear concentric with gear 24 associated with dial 11 as is more completely shown and described in the aforementioned Everard patent.

Dial 15 of the interval timer is non-rotatably mounted on a bearing bushing 38 which is fixed in panel 5. Arm 17 is fixed on a rotatable shaft 41, extending through bushing 38 and panel 5, frontwardly of dial 15. The stop 16 has an arm 16$^a$ rotatable on bushing 38 behind dial 15 and at its end has a detent 16$^b$ which engages with detent teeth 15$^a$ equally spaced about the periphery of the inturned edge 15$^b$ of dial 15. A helical torsion spring 43 anchored at one end on a lug 44 which is integral with sub-panel 34 and coiled around and anchored at its other end on the portion 41$^a$ of shaft 41 biases shaft 41 and arm 17 for counterclockwise rotation (as viewed in Fig. 2). Stop 16 limits the rotation of shaft 41 and arm 17 under the bias of spring 43.

Gear 31, which as aforeindicated is fixed on shaft 32 of motor 33, meshes with a gear 45 that is rotatably mounted on a stub shaft 46 fixed on panel 5. The latter gear also meshes with a small gear 47 rotatably mounted on a stub shaft 48 fixed on the panel. A larger gear 49 is also rotatably mounted on shaft 48 and is concentrically fixed to gear 47 to rotate with the latter. Gear 49 is adapted to be engaged, in mesh with, or disengaged from a gear 50 which is rotatably mounted on a stub shaft 51 fixed on a movable lever 52. A smaller gear 53 that is rotatably mounted on shaft 51 and concentrically fixed to gear 50 to rotate when the latter meshes with a gear 54 fixed on shaft 41. As will be hereinafter more fully explained, whenever lever 52 is pivotally moved to engage gear 50 in mesh with gear 49 a geared driving train is completed between the shaft 32 of motor 33 and shaft 41 of the interval timer to afford drive of the latter and arm 17 in the clockwise direction (as viewed in Fig. 2) against the bias of spring 43.

Lever 52 is rotatably mounted on a boss 55$^a$ formed about an opening in a second lever 55. Shaft 41 is rotatably supported on lever 55 in the last mentioned opening. At one end lever 55 is provided with an integral tab 55$^b$ extending at a right angle to its main portion 55$^c$. A riveted pin extending through alined openings in the forked end 56$^b$ of a solenoid plunger 56$^a$ of an electroresponsive operator 56 and the tab 55$^b$ connects lever 55 to plunger 56$^a$. Intermediate its ends, lever 55 is provided with an integral tab 55$^d$ which extends at right angles from its upper edge. Tab 55$^d$ provides a stop limiting relative clockwise movement between levers 52 and 55 as will hereinafter be more fully explained.

Lever 55 is pivotally connected by a pin 57 with a member 58 which is mounted for rectilinear sliding movement on the rear of panel 5 by means of a pair of screw pins 59 which extend through spaced apart elongated openings 58$^a$ and 58$^b$ in member 58 and take into threaded openings in the panel. An integral right angle tab 58$^c$ of member 58 has one end of a tension spring 60 attached thereto, and the other end of the spring is secured to an adjustable screw abutment 61. Spring 60 biases member 58 to its upper limit and thereby causes lever 55 to pivotally move counterclockwise on shaft 41 to disengage gears 49 and 50 whenever the energizing coil 56$^c$ of operator 56 is deenergized. It will be apparent that whenever coil 56$^c$ is energized plunger 56$^a$ will move inwardly of coil 56$^c$ and thereby pivotally move levers 52 and 55 clockwise to engage gears 49 and 50 to complete the driving connections between motor 33 and shaft 41 against the biasing action of spring 60 exerted through member 58.

A rod 62 at one end is hooked over stub shaft 51 and is hooked over at its other end on a pin 63 extending through and fixed to a toggle lever 64 adjacent one end of the latter. Lever 64, which is part of an over-center toggle lever mechanism, adjacent its other end is pivotally mounted on a pin 65 secured to panel 5. A tension spring 66 is anchored at one end on pin 63 and at its other end on a pin 67 fixed adjacent one end of a second toggle lever 68. Adjacent its other end lever 68 is fixed on the shaft 19 which extends through and is afforded rotational support in the panel. On the front of the panel switch operating lever 18 is fixed on shaft 19. With lever 18 biased against stop 21 levers 64 and 68 and spring 66 will assume the over-center positions depicted in Fig. 2 wherein spring 66 is stretched upwardly thereby tending to pivot lever 64 clockwise.

Thus as lever 55 pivots clockwise, as a result of energization of coil 56$^c$, the bias of spring 66 acting through lever 64 and rod 62 causes lever 52 to follow in clockwise movement against the stop 55$^d$ until the gear 50 meshes with gear 49. As the meshing of gears 49 and 50 completes the drive to shaft 41, arm 17 will then be driven off of stop 16 at a timed rate and at the end of the timed interval engages with lever 18 and pivots the latter and lever 68 counterclockwise and thereby cause levers 64 and 68 and spring 66 to move to an opposite over-center position wherein spring 66 is stretched downwardly. Consequently, lever 64 pivots counterclockwise on pin 65 to move rod 62 downwardly sufficiently to correspondingly pivot lever 52 counterclockwise on boss 55$^a$ to effect disengagement of gear 50 from gear 49 to interrupt the driving connection to shaft 41. As best shown in Fig. 7, lever 52 in moving down causes gear 50 to engage with a pawl 55$^e$ which is moved into locking position by a projection 62$^a$ on rod 62 engaging with a projection 55$^f$ on the pawl and such engagement locks gears 50 and 54, shaft 41 and arm 17 against rotation under the bias of spring 43.

Figure 6:
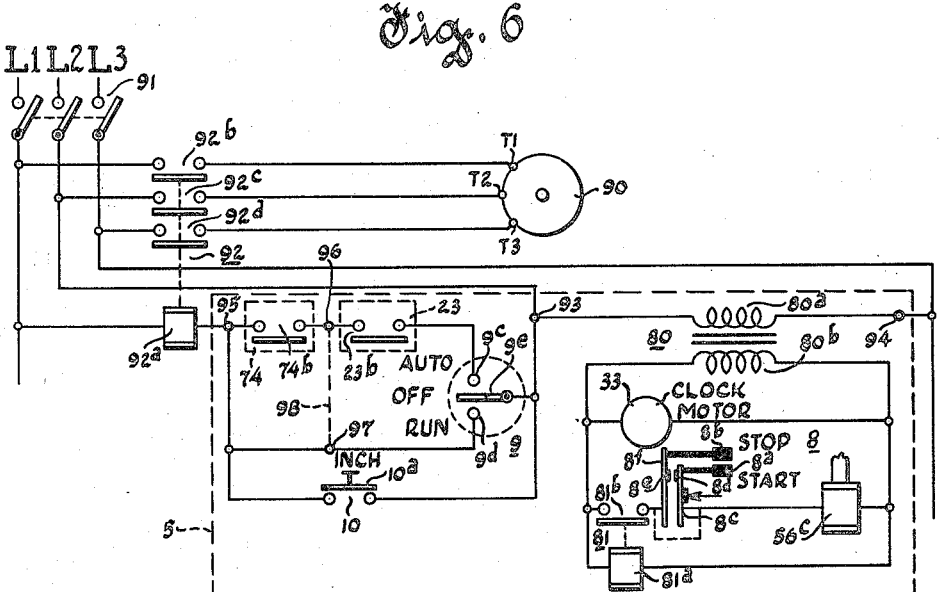
Fig. 6 is a diagram of a control system for an electric motor incorporating the controller of Figs. 1 to 5.

The movement of lever 64 to its last mentioned over-center position also results in its engagement with and movement of an actuator 74$^a$ of a switch 74 mounted on rear of the panel to operate the latter switch to close its contacts 74$^b$ (see Fig. 6). It may be assumed that when lever 64 is disengaged from actuator 74$^a$ that contacts 74$^b$ will assume their normal open position.

So long as coil 56$^c$ of operator 56 remains energized, or energized sufficiently to hold plunger 56$^a$ inwardly of the coil, the levers 52 and 55 will be maintained in their operating positions attained at the end of the timed interval. Likewise levers 64 and 68 will be retained in their last mentioned over-center positions, and arm 17 will also be maintained in the position it attained at the end of timed interval. Consequently switch 74 will be retained in the operating position in which its contacts 74$^b$ are closed.

Figure 2:
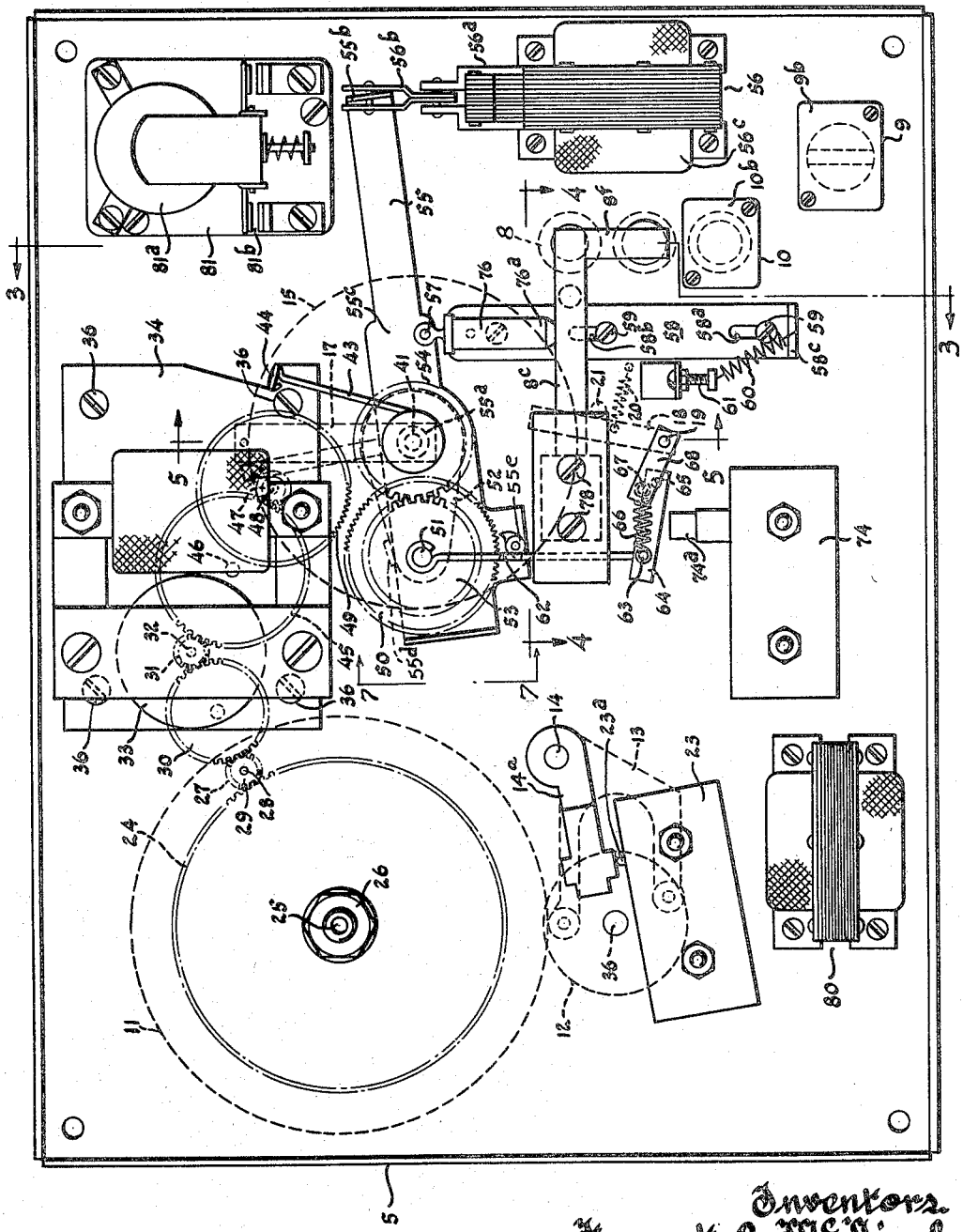
Fig. 2 is a rear elevational view of the electrical controller.

When coil 56$^c$ is thereafter deenergized, either deliberately as will hereinafter be more fully explained, or as a result of complete voltage failure or reduction of voltage below a predetermined value, spring 60 acting through member 58 causes lever 55 to pivot counterclockwise to again assume the position depicted in Fig. 2. The latter movement of lever 55 disengages the pawl 55$^e$ from gear 50 thereby releasing the latter, gear 54, shaft 41 and lever 17 for rotation under the bias of spring 43 to their normal positions depicted in Fig. 2. Lever 18 consequently pivots clockwise under the bias of spring 20 to effect corresponding clockwise pivotal movement of lever 68. The latter movement of lever 68 brings it, lever 64 and spring 66 into the first mentioned over-center position depicted in Fig. 2. Lever 64 in moving clockwise into its latter position releases actuator 74$^a$ to permit switch 74 to open its contact 74$^b$ and moves rod 62 upwardly. Rod 62 in moving upwardly moves lever 52 upwardly until it engages with stop tab 55$^d$ of lever 55.

A member 76, formed of electrical insulating material and having a depending portion 76$^c$, is secured to member 58 adjacent its upper end. When member 58 moves downwardly as a result of energization of coil 56$^c$, the portion 76$^c$ moves into engagement with a spring leaf contact member 8$^c$ of switch 8 and holds member 8$^c$ so that its contact 8$^d$ is maintained in engagement with contact 8$^e$ carried on a similar contact member 8$^f$ of switch 8 so long as coil 56$^c$ of operator 56 is maintained energized. Members 8$^c$ and 8$^f$ are mounted on an insulating block 77 secured on the rear of panel 5 by means of screws 78 and insulating pads 79 which separate them from each other. An insulated plunger 8$^g$ operated by push-button 8$^a$ is adapted to initially move member 8$^c$ to engage its contact 8$^d$ with the contact 8$^e$ of member 8$^f$. A somewhat longer insulated plunger 8$^h$ operated by push-button 8$^b$ is adapted when the latter is depressed to move member 8$^f$ away from member 8$^c$ to disengage the contacts if then engaged.

Housings 9$^b$ and 10$^b$ of "selector" switch 9 and "inch" switch 10, respectively are mounted on the rear of panel 5. The contacts of these switches will hereafter be described in connection with Fig. 6. A transformer 80 and an undervoltage relay 81 are also mounted on the rear of the panel and will be discussed more fully in connection with Fig. 6.

Electrical circuit connections for the various components mounted on panel 5 have been omitted in the showing of Figs. 2 to 5 for the sake of simplicity. Certain preferred electrical connections of these components for use in controlling an oil well pump motor will now be described in connection with Fig. 6.

Fig. 6 shows a three phase, A. C. electric motor 90, suitable for driving an oil well pump, and a circuit, inclusive of the aforedescribed controller, for controlling its connection to and disconnection from a source of three phase A. C. supply comprising the supply lines L1, L2 and L3. A manual three pole switch 91 is provided in lines L1, L2 and L3 to complete or interrupt their energizing connections. An electroresponsive contactor 92 having normally open contacts 92$^b$, 92$^c$ and 92$^d$ in the circuit connections to primary terminals T1, T2 and T3 of motor 90 are adapted to close and complete the energizing connections to motor 90 whenever its operating coil 92$^a$ is energized. Terminals 93 and 94 on panel 5 have connection with lines L2 and L3 of the power supply, respectively, and the primary winding 80$^a$ of transformer 80, is connected between terminals 93 and 94. Secondary winding 80$^b$ is connected across the terminals of motor 33 and operating coil 81$^a$ of relay 81, the series connected combination of normally open contact 81$^b$ of relay 81, contact members 8$^c$ and 8$^f$ and contacts 8$^d$ and 8$^e$ of switch 8, and coil 56$^c$ of the electroresponsive operator 56. Operating coil 92$^a$ of contactor 92 is connected at one end to line L1 and at its other end to a terminal 95 on panel 5. Switch 74 is connected between terminal 95 and a terminal 96 on the panel, and switch 23 is connected between terminal 96 and stationary contact 9$^c$ of "selector" switch 9. The other stationary contact 9$^d$ of switch 9 is connected to terminal 97, and the latter terminal has connection to terminal 95. Movable contactor 9$^e$ of switch 9 is connected to terminal 93. "Inch" switch 10, which may be assumed to be of the momentary close type, is connected between terminals 93 and 95.

When switch 91 is closed, assuming lines L1, L2 and L3 ahead of switch 91 to be energized, a voltage will be impressed across winding 80$^a$ of transformer 80 and motor 33 will be energized through the voltage induced across secondary winding 80$^b$. As aforeindicated, whenever motor 33 is energized the dials 11 and 12 will be driven. Consequently switch 23 will be operated to close for selected intervals and to open for other selected intervals during a twenty-four hour period and to be held open for one or more selected twenty-four hour periods, as determined by dial 12. If the voltage induced across winding 80$^b$ is normal, then coil 81$^a$ will be sufficiently energized to effect closure of its associated contacts 81$^b$.

Now assume that knob 9$^a$ of the selector switch is operated to "auto" position to thereby close contactor 9$^e$ on contact 9$^c$. Then if "start" button 8$^a$ of switch 8 is pushed in to engage contact 8$^d$ with contact 8$^e$ an energizing connection will be completed for the coil 56$^c$ through the then closed contacts 81$^b$ and 8$^d$ and 8$^e$. Of course energization results in completion of drive to the interval timer to effect operation of switch 74 to close its contacts 74$^b$ at the end of a selected timed interval and hold them closed so long as coil 56$^c$ remains energized. Contacts 8$^d$ and 8$^e$ are held closed by the member 76 as aforedescribed so long as coil 56$^c$ remains energized. However, contacts 8$^d$ and 8$^e$ can be opened at the will of the operator by pushing "stop" button 8$^b$ to deenergize coil 56$^c$.

If contact 23$^b$ of switch 23 are closed at the time of closing of contacts 74$^b$ and energizing circuit will be completed for operating coil 92$^a$ of contactor 92 from line L1 through coil 92$^a$, terminal 95, switches 74 and 23, and terminal 93 to line L2. Energization of coil 92$^a$ of course results in closure of contacts 92$^b$, 92$^c$ and 92$^d$ to connect motor 90 to the lines L1, L2 and L3. So long as coil 56$^c$ remains energized contacts 74$^b$ will remain closed, and starting and stopping of motor 90 will then be under the control of switch 23 and the program clock which controls the opening and closing of contacts 23$^b$.

In the event there is a failure in either the phase voltage between lines L1 and L2, or between lines L2 and L3, coil 92$^a$ will be deenergized to interrupt the connections to motor 90. Phase voltage failure between lines L1 and L2 causes deenergization of coil 92$^a$ directly, while phase voltage failure between lines L2 and L3 results first in deenergization of coil 81$^a$ of the undervoltage relay 81 to deenergize coil 56$^c$ and effect opening of contacts 74$^b$ to finally deenergize coil 92$^a$. Undervoltage relay 81 also provides for deenergization of coil 92$^a$ and opening of energizing connections to motor 90 in the event the phase voltage between lines L2 and L3 decreases below a predetermined value.

If switch 8 is included in the circuit connections for coil 56$^c$ as hereinbefore described, it will be apparent that start button 8$^a$ will have to be manually reclosed following deenergization of coil 56$^c$ before the latter can be again energized. For some applications this may be disadvantageous, and switch 8$^a$ can be omitted if desired and coil 56$^c$ connected across winding 80$^b$ only in series with the contacts 81$^b$, thereby providing for energization of coil 56$^c$ whenever the latter contacts are closed.

Adjusting "selector" switch 9 to "run" position, in which its contactor 9$^e$ is closed to contact 9$^d$, provides for continuous energization of coil 92$^a$ independently of the program clock and interval timer switches 23 and 74. By eliminating the connection between terminal 97 and 95 and alternatively connecting terminal 97 to terminal 96 as depicted by the broken line 98, continuous energization of coil 92$^a$ can be attained, subject to time delay start if contacts 74$^b$ are open at the time switch 9 is operated to "run" position.

The inclusion of "inch" switch 10 permits energization of coil 92ª so long as the operator holds its pushbutton 10ª in, and thus facilitates repair and maintenance work on the oil well pump or its driving motor.

The inclusion of undervoltage relay 81 is not essential if the operating characteristics of electroresponsive operator 56 are such that it will release its plunger 56ª when the voltage across its coil 56ᶜ falls below a predetermined value. Thus in some instances operator 56 can be relied upon to afford inherent undervoltage release as well as undervoltage protection. The drop out or release voltage of operator 56 can be adjusted within limits by changing the force exerted by spring 60 through adjustment of abutment 61.

We claim:

1. An electric controller comprising an electric motor, a program clock driven by said motor, an interval timer, normally interrupted driving connections between said motor and said timer, means including electroresponsive means energizable to complete said driving connections, means acting to interrupt said driving connections following completion of a timed interval by said timer, and switch means under the control of said clock and said timer to complete and interrupt a circuit as determined by the program of said clock following completion of the timed interval by said timer.

2. The combination according to claim 1 wherein deenergization of said electroresponsive means results in interruption of circuit by said switch means regardless of action of said clock.

3. The combination according to claim 1 wherein deenergization of said electroresponsive means affords interruption of said driving connections and wherein said combination further includes means acting at any time in response to deenergization of said electroresponsive means to afford reset of said timer if not then reset.

4. The combination according to claim 1 together with undervoltage responsive means in circuit with said electroresponsive means to interrupt the energizing connection to said electroresponsive means whenever the supply voltage decreases below a predetermined value and to prevent establishment of the latter energizing connection unless said supply voltage reaches another higher predetermined value.

5. The combination according to claim 1 wherein said electroresponsive means is provided with means insuring its return to deenergized operating position if the supply voltage falls below a predetermined value.

6. The combination according to claim 1 wherein said timer includes means for selecting and setting various predetermined timing intervals within a limited range.

7. The combination according to claim 1 wherein said switch means comprises a first switch under the control of said clock and a second switch in circuit with said first switch which is operated to circuit completing condition as a result of completion of the timed interval by said timer.

8. The combination with an electric motor, a source of electrical power supply and means energizable and deenergizable to complete and interrupt power supply connections to said motor, of a controller comprising an electric motor in circuit with said source, a program clock driven by the last mentioned motor, an interval timer, normally interrupted driving connections between said last mentioned motor and said timer, means including electroresponsive means energizable to complete said driving connections, means acting to interrupt said driving connections following completion of a timed interval by said timer, and switching means under control of said clock and said timer to complete and interrupt an energizing circuit for the first mentioned means as determined by the program of said clock following completion of the timed interval by said timer.

9. The combination according to claim 8 wherein said means which includes said electroresponsive means also includes means for selectively completing and interrupting energizing connections between said source and said electroresponsive means.

10. The combination according to claim 8 together with a selector switch operable to selectively complete the aforementioned energizing circuit inclusive of said first mentioned means, said switch means and said source, or complete energizing circuit connections from said source to said first mentioned means exclusive of said switch means or to interrupt either of the aforementioned circuits.

11. The combination according to claim 8 wherein said switch means comprises a first switch under the control of said clock and a second switch in series circuit with said first switch and which is operated to circuit completing condition as a result of completion of the timed interval by said timer.

12. The combination according to claim 11 together with a selector switch operable to selectively complete the aforementioned energizing circuit inclusive of said first mentioned means, said first and second switches and said source, or complete energizing circuit connections from said source through said second switch and said first mentioned means exclusive of said first switch, or to interrupt either of the aforementioned circuits.

13. The combination according to claim 8 wherein said source is a polyphase A. C. source, wherein said last mentioned motor is in circuit with, and the energizing connections for said electroresponsive means are established across one phase of said source and wherein the aforementioned circuit inclusive of said first mentioned means and said switch means is established across another adjacent phase of said source to insure stopping of the first mentioned motor in the event of interruption of voltage across either of said phases of said source.

14. The combination according to claim 13 together with a transformer having its primary winding connected across said one phase of said source and having its secondary winding in circuit with said last mentioned motor.

15. A program type, time delay start electrical controller comprising an electric motor, program clock driven by said motor, an interval timer, a gear train drive between said motor and said timer including an idler gear carried by an element movable to connect and disconnect said idler gear from at least one adjacent gear in said drive to afford completion and interruption of said drive, means normally biasing said element to disconnect said idler gear from said drive, means including electroresponsive means energizable to move said element to connect said idler gear for completion of said drive, means acting following completion of a timed interval by said timer to disconnect said idler gear from said drive, and switch means under the control of said clock and said timer to complete and interrupt a circuit as determined by the program of said clock following completion of the timed interval by said timer.

16. The combination according to claim 15 wherein the means acting following completion of a timed interval to disconnect said idler gear from said drive comprises a second element on which said idler gear is rotatably supported and which is rotatably supported on the first element, and means connected to said second element actuated by said timer following completion of said timed interval to move said second element independently of said first mentioned element to disconnect said idler gear from said drive.

17. The combination according to claim 16 wherein said timer has a member normally biased to a position determined by the duration of said timed interval and which is driven against said bias by completion of said drive to actuate the last mentioned means following completion of said timed interval, and wherein said combination further includes means releasably holding the timer member in its position attained after actuation of said last mentioned means.

18. The combination according to claim 17 wherein the last mentioned means comprises a ratchet pawl mounted on said first mentioned element so as to permit drive of said idler gear when said drive is completed and engage with said idler gear as a result of the aforementioned drive disconnecting movement of said second element to prevent return of said timer member under its bias until said first mentioned element is moved by its biasing means following deenergization of said electroresponsive means to disengage said pawl from said idler gear.

References Cited in the file of this patent

UNITED STATES PATENTS

| | | |
|---|---|---|
| 1,603,049 | Hall | Oct. 12, 1926 |
| 2,504,492 | Brown | Apr. 18, 1950 |